US012560423B2

(12) United States Patent
Hendriks et al.

(10) Patent No.: US 12,560,423 B2
(45) Date of Patent: Feb. 24, 2026

(54) INTEGRATED FIBER FOR OPTICAL SHAPE SENSING AND SPECTRAL TISSUE SENSING

(71) Applicant: KONINKLIJKE PHILIPS N.V., Eindhoven (NL)

(72) Inventors: Bernardus Hendrikus Wilhelmus Hendriks, Eindhoven (NL); Gert Wim 'T Hooft, Eindhoven (NL); Martinus Bernardus Van Der Mark, Best (NL); Johan Lub, Valkenswaard (NL); Torre Michelle Bydlon, Melrose, MA (US); Molly Lara Flexman, Melrose, MA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1135 days.

(21) Appl. No.: 17/268,973

(22) PCT Filed: Aug. 19, 2019

(86) PCT No.: PCT/EP2019/072161
§ 371 (c)(1),
(2) Date: Feb. 17, 2021

(87) PCT Pub. No.: WO2020/043531
PCT Pub. Date: Mar. 5, 2020

(65) Prior Publication Data
US 2021/0325172 A1      Oct. 21, 2021

Related U.S. Application Data

(60) Provisional application No. 62/723,508, filed on Aug. 28, 2018.

(51) Int. Cl.
*G01B 11/24* (2006.01)
*G01M 11/00* (2006.01)
(Continued)

(52) U.S. Cl.
CPC ............. *G01B 11/24* (2013.01); *G01M 11/31* (2013.01); *G02B 6/02042* (2013.01); *G02B 6/0288* (2013.01); *G02B 6/262* (2013.01)

(58) Field of Classification Search
CPC ............... G01B 11/24; G02B 6/02042; G02B 6/02076; G02B 6/028826; G02B 2/2817;
(Continued)

(56) References Cited

U.S. PATENT DOCUMENTS 5,627,934 A      5/1997  Muhs
8,773,650 B2      7/2014  Froggatt
(Continued)

FOREIGN PATENT DOCUMENTS

JP           2007128095       5/2007
JP           2007128095 A  *  5/2007  ......... G02B 21/0024
(Continued)

OTHER PUBLICATIONS

Yelin, et al: "Double-clad fiber for endoscopy", Optic Letters, vol. 29, No. 20, Oct. 15, 2004.
(Continued)

*Primary Examiner* — Tri T Ton

(57)     ABSTRACT

An optical apparatus (200) includes an outer jacket (230), common cladding (220), and multiple single mode fiber cores (210). The common cladding (220) is within the outer jacket (230) and is used as multimode fiber such that the outer jacket (230) clads the common cladding (220). The single mode fiber cores (210) are within the common cladding (220) such that the common cladding (220) clads the plurality of single mode fiber cores (210).

16 Claims, 10 Drawing Sheets

(51) Int. Cl.
| | |
|---|---|
| *G02B 6/02* | (2006.01) |
| *G02B 6/028* | (2006.01) |
| *G02B 6/26* | (2006.01) |

(58) Field of Classification Search
CPC .... G02B 6/0288; G02B 6/262; G02B 6/2817; G02B 6/32; A61B 5/0073; A61B 5/0075; A61B 5/0084; A61B 5/01; A61B 5/065; A61B 5/4869; A61B 2017/00203; A61B 2562/0238; A61B 2034/2061; G01M 11/31; G01N 21/474; G01N 2021/4742; G01N 2201/088
See application file for complete search history.

(56) References Cited

U.S. PATENT DOCUMENTS

| | | | | |
|---|---|---|---|---|
| 10,228,556 | B2 * | 3/2019 | Reddy | G01B 11/2513 |
| 2012/0069347 | A1 | 3/2012 | Klein | |
| 2012/0101374 | A1 | 4/2012 | Tearney | |
| 2013/0170804 | A1 | 7/2013 | Hayashi | |
| 2015/0029511 | A1 | 1/2015 | 'T Hooft | |
| 2016/0226220 | A1 * | 8/2016 | Kanskar | G02B 6/03633 |
| 2016/0238783 | A1 | 8/2016 | Nagashima | |
| 2017/0017075 | A1 | 1/2017 | Reddy | |
| 2020/0326472 | A1 * | 10/2020 | Li | G02B 6/02042 |
| 2021/0325172 | A1 | 10/2021 | Hendricks | |

FOREIGN PATENT DOCUMENTS

| | | | | |
|---|---|---|---|---|
| JP | 2017183564 | A | 10/2017 | |
| WO | 2015/153982 | | 10/2015 | |
| WO | WO-2015193191 | A1 * | 12/2015 | G01B 11/161 |
| WO | 2017182535 | A1 | 10/2017 | |
| WO | 2018/107119 | A1 | 6/2018 | |
| WO | 2018/125713 | | 7/2018 | |

OTHER PUBLICATIONS

International Search Report and Written Opinion Dated Nov. 12, 2019 for International Application No. PCT/EP2019/072161 Filed Aug. 19, 2019.

G. Chatzikyakos et al. "Nonlinear optical response of a symmetrical Au dithiolene complex under ps and ns laser excitation in the infrared and in the visible", Chemical Physics Letters 513 (2011) 229-235.

Nachabé, et al: "Estimation of biological chromophores using diffuse optical spectroscopy: benefit of extending the UV-VIS wavelength range to include 1000 to 1600 nm", R. Nachabé, Optics Express, vol. 18, 2010, pp. 879-888.

Farrell, et al: "A diffusion theory model of spatially resolved, steady-state diffuse reflectance for the non-invasive determination of tissue optical properties,", Med. Phys. 19 (1992) p. 879-888.

Nachabé, et al: "Estimation of lipid and water concentrations in scattering media with diffuse optical spectroscopy from 900 to 1600nm", J. Biomed. Opt., vol. 15, No. 3, pp. 37015-10, 2010.

Müller, et al: "Recovering intrinsic fluorescence by Monte Carlo modeling", J. Biomed. Opt., vol. 18, No. 2, pp. 27009-13, 2013.

Papavassiliou, et al: Neutral Metal 1,2-Dithiolenes: Preparations, Properties and Possible Applications of Unsymmetrical in Comparison to the Symmetrical, Crystals 2012, 2, 762-811.

Chang, et al: "Towards a field-compatible optical Spectroscopic device for cervical cancer screening in resourcelimited settings: effects of calibration and pressure", Sep. 12, 2011 / vol. 19, No. 19 / Optics Express.

Lim, et al: "Probe pressure effects on human skin diffuse reflectance and fluorescence spectroscopy measurements", Journal of Biomedical Optics 16(1), 011012 (Jan. 2011).

Bydlon, et al.: "Chromophore based analyses of steady-state diffuse reflectance spectroscopy: current status and perspectives for clinical adoption", J. Biophotonics 8, No. 1-2, 9-24 (2015).

Dr. Rüdiger Paschotta Rüdiger: "V-number—normalized frequency, stepindex fiber, number of modes" In: "RP Photonics Encyclopedia", Jan. 1, 2007 (Jan. 1, 2007), RP Photonics AG, XP093334925, pp. 1-4, DOI: 10.61835/8ty, Retrieved from the Internet: URL: https://www.rp-photonics.com/v_number.html.

* cited by examiner

Fiber optic bragg grating
strain sensors
193

Optical shape
sensing fiber
200

OSS fiber termination

403
Multi-core fiber

450
Terminator

OSS fiber termination

403
Multi-core fiber

450
Terminator

OSS fiber termination

403
Multi-core fiber

450
Terminator

INTEGRATED FIBER FOR OPTICAL SHAPE SENSING AND SPECTRAL TISSUE SENSING

CROSS REFERENCE TO RELATED APPLICATIONS

This application is the U.S. National Phase application under 35 U.S.C. § 371 of International Application No. PCT/EP2019/072161 filed Aug. 19, 2019, which claims the benefit of U.S. Provisional Patent Application No. 62/723, 508 filed Aug. 28, 2018. These applications are hereby incorporated by reference herein.

BACKGROUND

Interventional medical procedures are medical procedures that involve interventions within humans, such as in blood vessels, using interventional medical devices such as needles and catheters. Interventional medical procedures always require some form of navigation, and also often require direct real-time tissue feedback such as to ensure that the correct tissue is treated.

For instance, cardiovascular procedures often require catheters that are navigated through vascular systems to reach diseased tissue and to treat the diseased tissue accordingly. One way to navigate is by integrating an optical shape sensing (OSS) fiber into the interventional medical device. Optical shape sensing (OSS) may also be known as fiber-based shape sensing or fiber sensing and is based on the principle that the wavelengths of reflected light differ under distinct circumstances, such as a change of temperature or strain, that correlate with an interference pattern in the optical fiber. A description of optical shape sensing can be found in U.S. Pat. No. 8,773,650 to FROGATT et al., entitled 'Optical Position and/or Shape Sensing', and in U.S. Patent Application Publication No. 2012/0069347 to KLEIN et al., entitled 'Compensating for non-ideal multi-core optical fiber structure'.

Separately, real-time tissue feedback becomes possible with spectral tissue sensing (STS). Diffuse optical spectroscopy is a technique which sends white light into tissue and measures the reflected light. The reflected light has a specific spectral distribution due to the absorption and scattering of photons interacting with the tissue. Since these changes are determined by the tissue composition, the technique provides tissue discrimination. This spectral tissue sensing can be achieved by incorporating a multimode optical fiber into the interventional medical device to provide real-time tissue feedback at the tip of the interventional medical device.

Integrating optical shape sensing and spectral tissue sensing in surgical devices would require a surgical device that integrates two different and separated fibers to be able to perform optical shape sensing and spectral tissue sensing. However, many interventional medical procedures require small lateral dimensions and high flexibility to allow for small bending radius. Integrating two different and separated fibers will mean either that the surgical device becomes stiffer and thereby compromises the bending radius, or that at least one of the fibers will be subject to a significant amount of strain due to the bending. Additionally, cores of optical shape sensing fibers are designed for single mode usage while spectral tissue sensing requires multi-mode fiber. Therefore, optical shape sensing and spectral tissue sensing are not integrated, for example in a single, integrated optical shape sensing fiber adapted also for spectral tissue sensing.

In optical shape sensing, Fiber Bragg Gratings (FBGs) are strain sensors that act as a reflector in a short segment of a fiber core of the optical shape sensing fiber. The FBGs reflects particular wavelengths of light and transmits all others. The reflection/transmission characteristics can be achieved by adding a periodic variation of the refractive index in the fiber core, which generates a wavelength-specific dielectric mirror. FBGs can therefore be used as an inline optical reflector to reflect particular wavelengths and transmit all others.

FBGs are used to track the 3-dimensional (3D) shapes of needles or catheters in real-time. Three or more fiber cores each with a corresponding integrated FBG can be utilized together to track the 3D shapes of the fibers in real-time. Specifically, FBG strain sensors in multiple cores of the single mode fiber are used to determine how any point along the single-mode fiber is positioned in space. The characteristics of optical fibers and the FBGs vary with curvature, and by sensing the relative change of FBGs in each of three or more fiber cores, the 3D change in position can be determined.

FIG. 1A illustrates a known optical fiber with a fiber core using an FBG. In FIG. 1A, a, FBG is shown as an inline optical reflector to reflect particular wavelengths and transmit all others. The fundamental principle behind the operation of an FBG as in FIG. 1A is Fresnel reflection at each of the interfaces where the refractive index is changing. For some wavelengths the reflected light of the various periods is in phase with one another so that constructive interference exists for reflection and consequently, destructive interference for transmission.

FIG. 1B illustrates a refractive index profile of the known fiber core using the FBG in FIG. 1A. In FIG. 1B, the change of the refractive index along the known fiber core in FIG. 1A is shown as the refractive index profile.

FIG. 1C illustrates a spectral response of the known optical fiber with the fiber core using the FBG in FIG. 1A. In FIG. 1C, the X axis for each chart represents wavelength $\lambda$, and the Y axis represents the Input (e.g., intensity) for the left chart, the resultant Transmitted components for the middle chart, and the resultant Reflected components for the right chart.

In the right chart of FIG. 1C, the Bragg wavelength is shown as B. The Bragg wavelength is sensitive to strain as well as to temperature. In an FBG sensor, the quantity to be measured causes a shift in the Bragg wavelength, $\Delta\lambda_B$. The relative shift in the Bragg wavelength, $\Delta\lambda_B/\lambda_B$, due to an applied strain (c) and a change in temperature ($\Delta T$) is approximately given by:

$$\frac{\delta\lambda_B}{\lambda_B} = C_s\varepsilon + C_T\Delta T$$

The coefficient Cs is called the coefficient of strain and its magnitude is usually around $0.8\times10^{-6}/\mu\varepsilon$ (or in absolute quantities about 1 pm/$\mu\varepsilon$). The coefficient $C_T$ describes the temperature sensitivity of the sensor and is made up of the thermal expansion coefficient and the thermo-optic effect. Its value is around $7\times10^{-6}/K$ (or as an absolute quantity 13 pm/K).

FIG. 1D illustrates a known optical fiber with multiple fiber cores and corresponding FBG strain sensors. One of the main advantages of using FBGs in optical shape sensing is that various FBGs can be distributed over the length of a fiber. Incorporating three cores with various FBGs along the length of a fiber that is embedded in an interventional medical device allows for the 3D form of such an interventional medical device to be precisely determined. This situation is depicted in FIG. 1D. Three FBG sensors are located along the length of the fiber at various positions. Four cores are used in total, with three of the four as outer cores helically wound around the fourth as a central core. This allows for common mode, twist and bend in two directions to be measured. From the strain measurement of each FBG the curvature of the interventional medical device can be inferred at that position. From the multitude of measured positions, the 3D form of the optical fiber is determined.

SUMMARY

According to an aspect of the present disclosure, an optical apparatus includes an outer jacket, common cladding, and multiple single mode fiber cores. The common cladding is within the outer jacket and is used as multimode fiber such that the outer jacket clads the common cladding. The single mode fiber cores are within the common cladding such that the common cladding clads the plurality of single mode fiber cores.

According to another aspect of the present disclosure, an optical system includes a memory, a processor, an outer jacket, common cladding, and multiple single mode fiber cores. The memory stores instructions. The processor executes the instructions. The common cladding is within the outer jacket and is used as multimode fiber such that the outer jacket clads the common cladding. The single mode fiber cores are within the common cladding such that the common cladding clads the plurality of single mode fiber cores. When executed by the processor, the instructions cause the optical system to execute a process that includes performing spectral tissue sensing based on light that passes through the common cladding.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

FIG. 6A illustrates a gold metal complex with maximum absorption wavelength of 1500 nm for optical shape sensing and spectral tissue sensing, in accordance with a representative embodiment.

FIG. 6B illustrates a gold metal complex with maximum absorption wavelength of 1670 nm for optical shape sensing and spectral tissue sensing, in accordance with a representative embodiment.

DETAILED DESCRIPTION

Figure 1A:
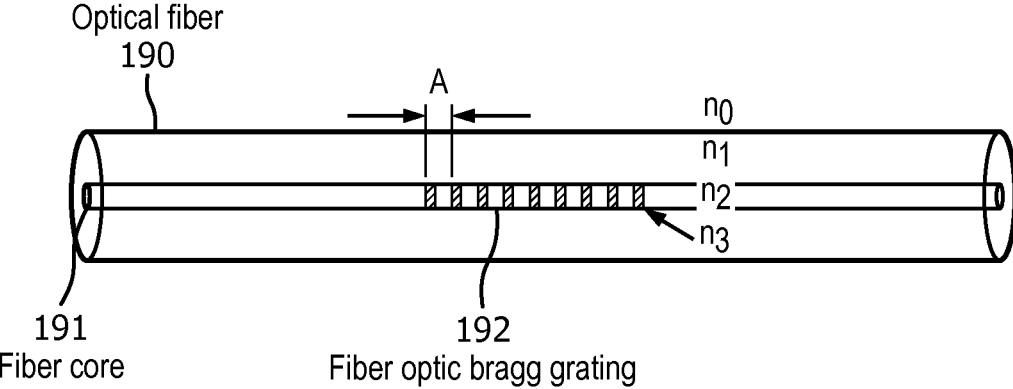
FIG. 1A illustrates a known optical fiber with a fiber core using an FBG.
Figure 1B:
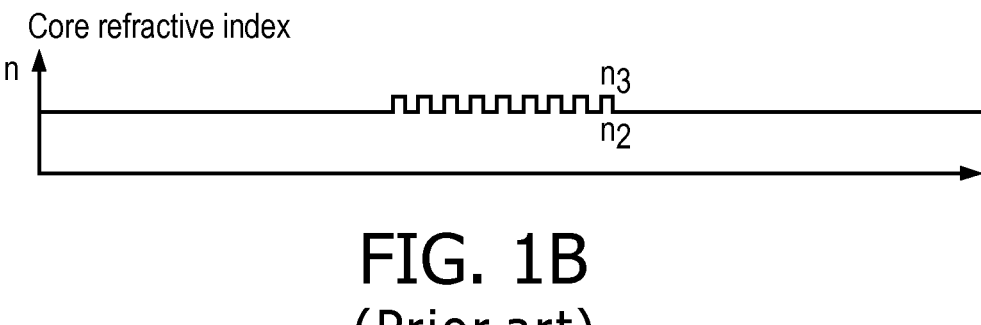
FIG. 1B illustrates a refractive index profile of the known fiber core using the FBG in FIG. 1A.
Figure 1C:
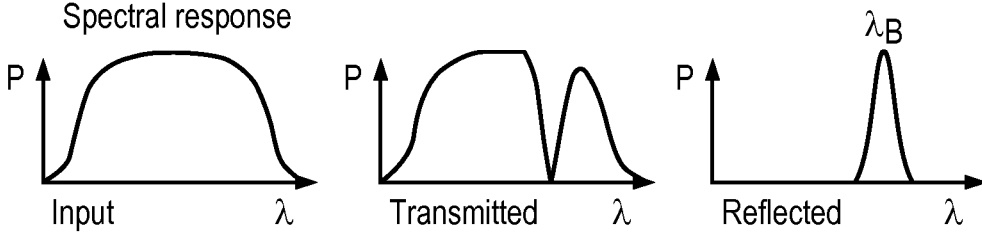
FIG. 1C illustrates a spectral response of the known optical fiber with the fiber core using the FBG in FIG. 1A.
Figure 1D:
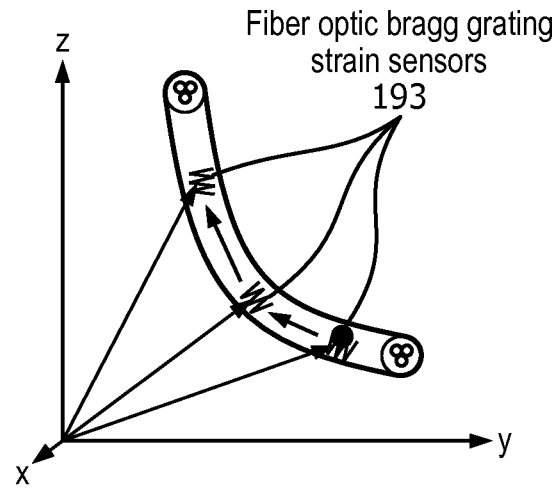
FIG. 1D illustrates a known optical fiber with multiple fiber cores and corresponding FBG strain sensors.

In the following detailed description, for purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only, and is not intended to be limiting. The defined terms are in addition to the technical and scientific meanings of the defined terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the inventive concept.

The terminology used herein is for purposes of describing particular embodiments only, and is not intended to be limiting. As used in the specification and appended claims, the singular forms of terms 'a', 'an' and 'the' are intended to include both singular and plural forms, unless the context clearly dictates otherwise. Additionally, the terms "comprises", and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to", "coupled to", or "adjacent to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

In view of the foregoing, the present disclosure, through one or more of its various aspects, embodiments and/or specific features or sub-components, is thus intended to bring out one or more of the advantages as specifically noted below. For purposes of explanation and not limitation, example embodiments disclosing specific details are set forth in order to provide a thorough understanding of an embodiment according to the present teachings. However, other embodiments consistent with the present disclosure that depart from specific details disclosed herein remain within the scope of the appended claims. Moreover, descriptions of well-known apparatuses and methods may be omitted so as to not obscure the description of the example embodiments. Such methods and apparatuses are within the scope of the present disclosure.

As described herein, optical shape sensing fiber is adapted to consist of several single mode fiber cores of a few micrometers embedded in a common cladding that in turn is surrounded by a jacket. The common cladding is used as multimode fiber for the spectroscopy measurements. In order to trap the light into the common cladding of/for the optical shape sensing single mode fiber cores, an outer jacket serves as the cladding of/for the common cladding used as multimode fiber for spectroscopy measurements. The outer jacket requires a lower refractive index than that of the common cladding in order to serve as the cladding of/for the common cladding. Using teachings provided herein, optical shape sensing and spectral tissue sensing can be integrated in a flexible elongated device such as a guide wire or catheter, thereby allowing high flexibility and small bending radii.

Figure 2:
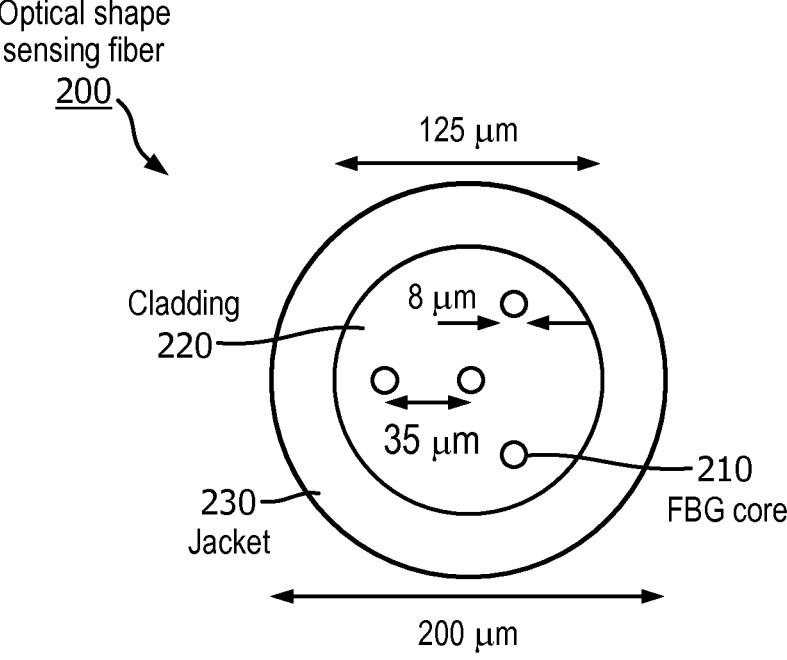
FIG. 2 illustrates an integrated fiber for optical shape sensing and spectral tissue sensing, in accordance with a representative embodiment.

FIG. 2 illustrates an integrated fiber for optical shape sensing and spectral tissue sensing, in accordance with a representative embodiment.

In FIG. 2, an optical shape sensing fiber 200 includes four FBG cores 210 within cladding 220. The four FBG cores 210 are single mode fiber cores, each used individually to identify a location/position of the optical shape sensing fiber 200 in optical shape sensing. The cladding 220 may be of a type commonly used to clad single-mode fiber cores such as the four FBG cores 210 and may be considered and referred to herein as common cladding. The cladding 220 is shown within jacket 230, so that the jacket 230 may be considered an outer jacket. The optical shape sensing fiber 200 may be considered an optical apparatus such as an article of manufacture. In FIG. 2, each of the four FBG cores may have a diameter such as 8 μm. The closest spacing between centers of any of the four FBG cores may be a spacing such as 35 μm. The diameter of the cladding 220 may be on the order of 125 μm. The diameter of the jacket 230 may be on the order of 200 μm. Although four FBG cores are shown in FIG. 2, a minimum requirement in an embodiment may be at least two single mode fiber cores within the common cladding, i.e., cladding 220.

In an embodiment, the optical shape sensing fiber 200 includes one central core and three outer cores helically wound around the central core. As an example, the twist rate for the three outer cores may be 50 turns/meter+/−5 turns/meter. A typical distance from the three outer cores to the central core may be 35 μm. The common cladding may consist of silica and the central core and outer cores may consist of GeO doped silica. The doping should be sufficiently high so that the numerical aperture is around 0.21 and the accompanying Rayleigh scattering in the three outer cores and central core is enhanced by 6 dB or more with respect to standard telecommunications fiber. The typical cladding diameter is 125 μm. For optical shape sensing Rayleigh backscatter signals may be used. FBGs may be written in the central core and outer cores in order to boost the signal levels. For the purpose of spectral tissue sensing, the jacket 230 should have a refractive index that is lower than that of the silica common cladding. In an embodiment, the jacket 230 is transparent in the ultraviolet spectrum to allow for writing of FBGs after the jacket 230 is drawn over the common cladding. In other words, a jacket 230 that is transparent in the ultraviolet spectrum allows for drawing the FBGs through the jacket 250. The common cladding has a refractive index of 1.46. Amorphous fluoropolymer CYTOP™ may be used for the jacket 230, since it has a refractive index of 1.3335 around a wavelength 1550 nm, and a 95%/meter transmission for 200 μm thickness. Alternatively, a silicone coating could be used for the jacket 230, since it has a refractive index around 1.40, and a 90%/meter transmission for 200 μm thickness, so that FBGs can be written through the jacket 230 when made of a silicone coating.

Figure 3:
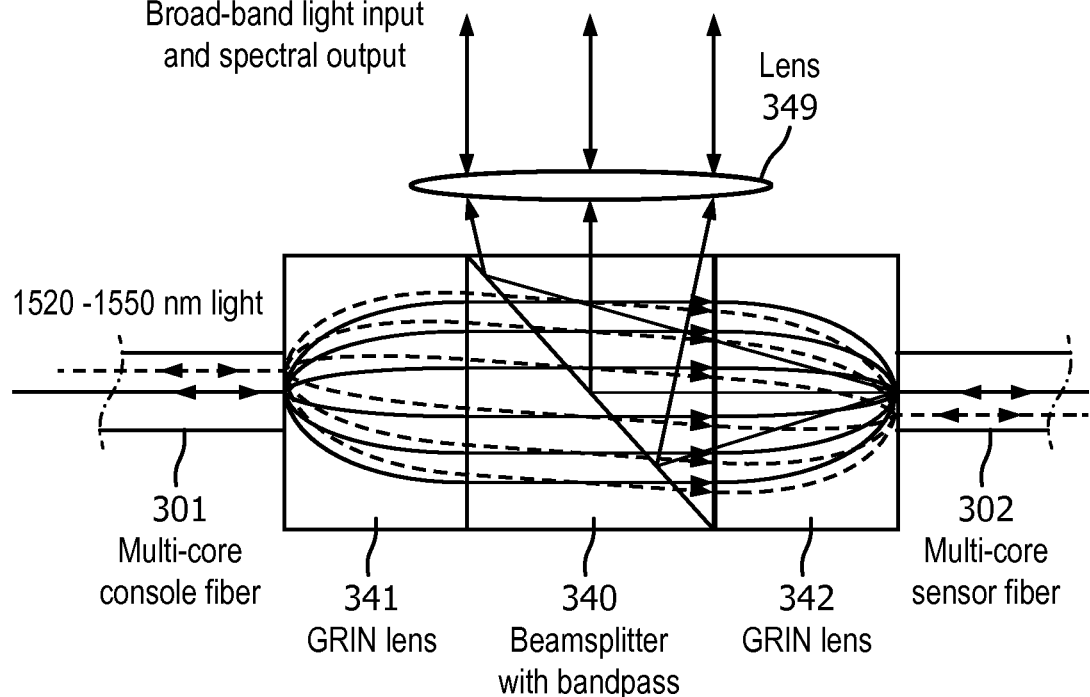
FIG. 3 illustrates an optical shape sensing fiber apparatus for integrated fiber for optical shape sensing and spectral tissue sensing, in accordance with a representative embodiment.

FIG. 3 illustrates an optical shape sensing fiber apparatus for integrated fiber for optical shape sensing and spectral tissue sensing, in accordance with a representative embodiment.

In spectral tissue sampling, the fiber of an optical catheter may be connected to an optical console. The console performs dual functions of sourcing the light for the spectral tissue sampling and detecting the reflected light. The console may include an optical guide such as an optical waveguide. In FIG. 3, the optical guide from the console is shown as multi-core console fiber 301. In a specific embodiment, the console may include a light source in the form of a halogen broadband light source with an embedded shutter, and a sleeve around an interventional device with an optical detector. The optical detector can resolve light with a wavelength substantially in the visible and infrared regions of the wavelength spectrum, such as from 400 nm to 1500 nm. The multi-core console fiber 301 allows for sending and receiving light enabling diffuse reflectance measurements.

Although diffuse reflectance spectroscopy is described above as the mechanism to extract tissue properties, other optical methods such as diffuse optical tomography can also be used by employing multiple optical fibers, differential path length spectroscopy, fluorescence and Raman spectroscopy (or SORS Spatially offset Raman Spectroscopy).

The console may also include a processor that transforms measured spectra into physiological parameters that are indicative for the tissue state for each pair of emitted light and detected light.

In FIG. 3, a multi-core console fiber 301 is connected to a multi-core sensor fiber 302 via an optical shape sensing fiber apparatus as shown. The optical shape sensing fiber apparatus includes two gradient index lenses (GRIN lenses), i.e., a GRIN lens 341 and a GRIN lens 342, a beamsplitter with bandpass 340, and a lens 349. The beamsplitter with bandpass 340 passes light within a predetermined passband, reflects spectral light output from the right upward, and reflects other light that includes broad-band light input from the top rightwards towards the multi-core sensor fiber 302. The light reflected upward is passed through a lens 349.

Although not shown, the multi-core console fiber 301 and the multi-core sensor fiber 302 may include one or all of the characteristics, elements and/or features of the optical shape sensing fiber 200 in FIG. 2 and even the optical fiber 190 in FIG. 1A. That is, the multi-core console fiber 301 and the multi-core sensor fiber 302 may include multiple cores, such as a central core and peripheral cores arranged around the central core. Each core of the multi-core sensor fiber 302 may include an FBG to assist in optically sensing the shape of the multi-core sensor fiber 302.

The GRIN lens 341 and GRIN lens 342 in FIG. 3 are examples of light incoupling devices for optical shape sensing. In optical shape sensing, reflected light from connectors, splices and fiber ends should be minimized to avoid overwhelming the relatively weak reflection signals coming from each point along the sensor fiber. GRIN lenses generally combine a favorable form factor and possible low reflection to make suitable connections in the fiber-optic network or as a connector for the fiber sensor. GRIN lenses may be used because the light is not refracted at an air-glass transition but bends in a graded index profile in the radial direction. The properties of GRIN lenses are used to eliminate all air to glass transitions when the connection is established. The optical shape sensing fiber and the GRIN lenses can be fusion spliced, glued or otherwise index-matched and pushed together.

GRIN lenses are made for example, of "quarter-pitch" length, so that a set of collimated beams may enter and exit the GRIN lenses to and from the focal points at the cores of the optical shape sensing fiber. If some extra optical element of very similar refractive index is introduced, the collimated beam may easily pass through without significant back reflection. The optics may be a window, for example. In FIG. 3 the optics are the beamsplitter with bandpass 340. Example of a beamsplitter with bandpass 340 include a dichroic mirror, a polarizing beamsplitter, and a band-pass splitter. In FIG. 3 the beamsplitter with bandpass 340 transmits the 1545 nm light but reflects all wavelengths shorter than 1400 nm, for example. An extra lens, GRIN lens, optical fiber or other optical part may be used to launch the shorter wavelength light into the inner cladding of the multi-core sensor fiber 302. A good optical contact between all elements may be accomplished by refractive index matching glue or by a compressible material such as a silicone foil of the right refractive index.

As an alternative of the light paths shown in FIG. 3, it may be more practical to build an arrangement with a different beamsplitter that reflects light at 1545 nm and transmits broadband light. Additionally, in an embodiment a beamsplitter may have two ports arranged at perpendicular angles. In another embodiment, a beamsplitter may have two ports arranged at another angle, greater than or less than perpendicular to one another.

Additionally, the bandpass on the beamsplitter with bandpass 340 may transmit the optical shape sensing wavelength which is typically between 1520 nm and 1570 nm, and reflect all other wavelengths. If the bandpass on the beamsplitter with bandpass 340 is imperfect and some of the light between 1520 nm and 1570 nm is reflected, the reflected light may be absorbed by putting a termination on the beamsplitter with bandpass 340. An example of a termination is described as an absorbing material for embodiments below.

Figure 4A:
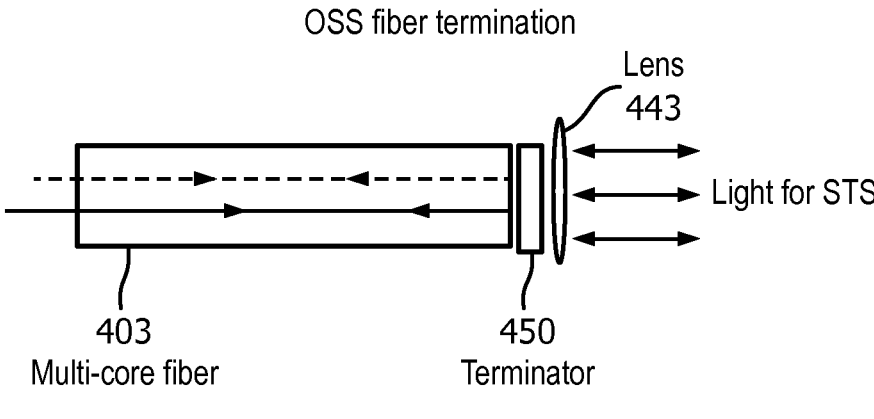
FIG. 4A illustrates another optical shape sensing fiber apparatus for integrated fiber for optical shape sensing and spectral tissue sensing, in accordance with a representative embodiment.

FIG. 4A illustrates another optical shape sensing fiber apparatus for integrated fiber for optical shape sensing and spectral tissue sensing, in accordance with a representative embodiment.

In FIG. 4A, a multi-core fiber 403 terminates with a terminator 450. A lens 443 on the opposite of the terminator 450 focuses or defocuses light for spectral tissue sensing (STS). The terminator 450 is an optical shape sensing (OSS) fiber termination and terminates light in the bandwidth used for optical shape sensing. Although not shown, the multi-core fiber 403 may include one or all of the characteristics, elements and/or features of the optical shape sensing fiber 200 in FIG. 2 and even the optical fiber 190 in FIG. 1A. That is, the multi-core fiber 403 may include multiple cores, such as a central core and peripheral cores arranged around the central core. Each core of the multi-core fiber 403 may include an FBG to assist in optically sensing the shape of the multi-core fiber 403.

In the embodiment of FIG. 4A, the lens 443 may be representative of one or more lenses used to collimate spectral tissue sensing light into tissue and to receive reflected light from the tissue.

Figure 4B:
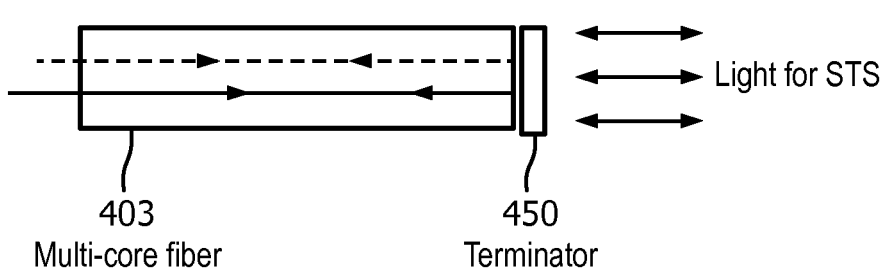
FIG. 4B illustrates another optical shape sensing fiber apparatus for integrated fiber for optical shape sensing and spectral tissue sensing, in accordance with a representative embodiment.

FIG. 4B illustrates another optical shape sensing fiber apparatus for integrated fiber for optical shape sensing and spectral tissue sensing, in accordance with a representative embodiment.

In FIG. 4B, a multi-core fiber 403 terminates with a terminator 450, but there is no lens 443 or any other optical element shown on the other side of the terminator 450. The terminator 450 is the terminator 450 from FIG. 4A, and thus terminates light in the bandwidth used for optical shape sensing. The light for spectral tissue sensing (STS) on the other side of the terminator 450 may be used in any appropriate manner. Thus, the absence of a lens or other optical element in FIG. 4B is not to imply a prohibition on the lens or other optical element; rather any lens or other appropriate optical element may be used on the other side of the terminator 450 in FIG. 4B.

Figure 4C:
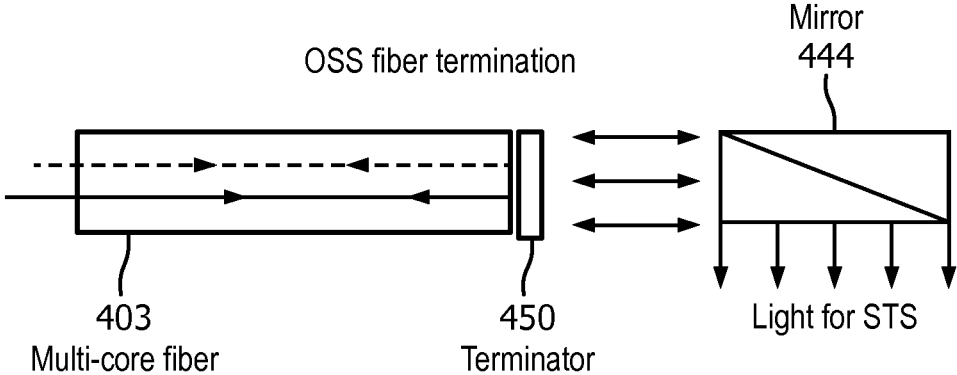
FIG. 4C illustrates another optical shape sensing fiber apparatus for integrated fiber for optical shape sensing and spectral tissue sensing, in accordance with a representative embodiment.

FIG. 4C illustrates another optical shape sensing fiber apparatus for integrated fiber for optical shape sensing and spectral tissue sensing, in accordance with a representative embodiment.

In the embodiments of FIGS. 4A, 4B and 4C, the cores of the multi-core fiber 403 may be two or more FBG cores. As was explained previously for the embodiment of FIG. 2, at least one outer core may be helically wound around a central core.

Additionally, in FIG. 4C, a multi-core fiber 403 terminates with a terminator 450. A mirror 444 on the opposite of the terminator 450 reflects (downward) light for spectral tissue sensing (STS). The terminator 450 is again an optical shape sensing (OSS) fiber termination and terminates light in the bandwidth used for optical shape sensing. The multi-core fiber 403 is again the multi-core fiber 403 from FIG. 4A, and may include one or all of the characteristics, elements and/or features of the optical shape sensing fiber 200 in FIG. 2 and/or the optical fiber 190 in FIG. 1A.

In FIGS. 4A, 4B and 4C described above, a terminator 450 may take a variety of forms. The terminator 450 is a light terminator at the end of the multi-core fiber 403 which is used as an optical shape sensing fiber. The terminator 450 may be used to ensure that light reaching the end of the multi-core fiber 403 at the wavelength(s) used for optical shape sensing is not reflected and is not transmitted. As such, a light absorbing element may be attached to the distal end of the multi-core fiber 403 as the terminator 450. To ensure no reflections, the light absorbing element used as the terminator 450 must not absorb the light used for spectral tissue sensing. Hence the light absorbing element used as the terminator 450 should only absorb the light of 1545 nm and immediately surrounding wavelengths. The suppression may involve a suppression of greater than 100000 times at 1545 nm. For this a material should have two properties, i.e.:

an absorption band around 1545 nm sufficient transparency at the visible and near-infrared light i.e. between 400 nm and 1300 nm As described above, optical shape sensing fiber 200, multi-core sensor fiber 302, and multi-core fiber 403 consist of several single mode fiber cores of a few micrometers embedded in a common cladding that in turn is surrounded by a jacket. The common cladding is used as multimode fiber for the spectroscopy measurements. The outer jacket such as jacket 230 is used as cladding of the multimode common cladding in order to trap light into the common cladding. Accordingly, the outer jacket such as jacket 230 has a lower refractive index than that of the common cladding.

In the embodiment of FIG. 3 above, coupling of light into the multi-core sensor fiber 302 allows simultaneous optical shape sensing and spectral tissue sensing. For the coupling of light into the optical shape sensing fiber, a gradient index (GRIN) lens is used i.e. a bundle of light is focused to a small spot the size of the core of the optical shape sensing fiber by this GRIN lens such that the light can be coupled in the core. By using two of these GRIN lenses with a beam splitter in between, the light used for optical shape sensing (typically 1545 nm) is separated from the broadband light used for the spectral tissue sensing.

Additionally, as described for FIGS. 4A, 4B and 4C, the distal end of the optical shape sensing fiber is covered with an absorbing material that absorbs the light sent into the cores with the FBGs. This prevents reflected light from the distal fiber end from disturbing the optical shape sensing signal. It is not advantageous to use a beamsplitter at this distal end of the optical shape sensing fiber, though a reflecting surface may be used after the absorbing material used to terminate one or more bandwidths of the light received at the absorbing material. A beamsplitter (e.g., a simple mirror) with a lens or other optical element (e.g., a prism, scattering material, polarizer, GRIN lens) may be provided on the other side of the absorbing material from the optical shape sensing fiber.

Figures 5A, 5B:
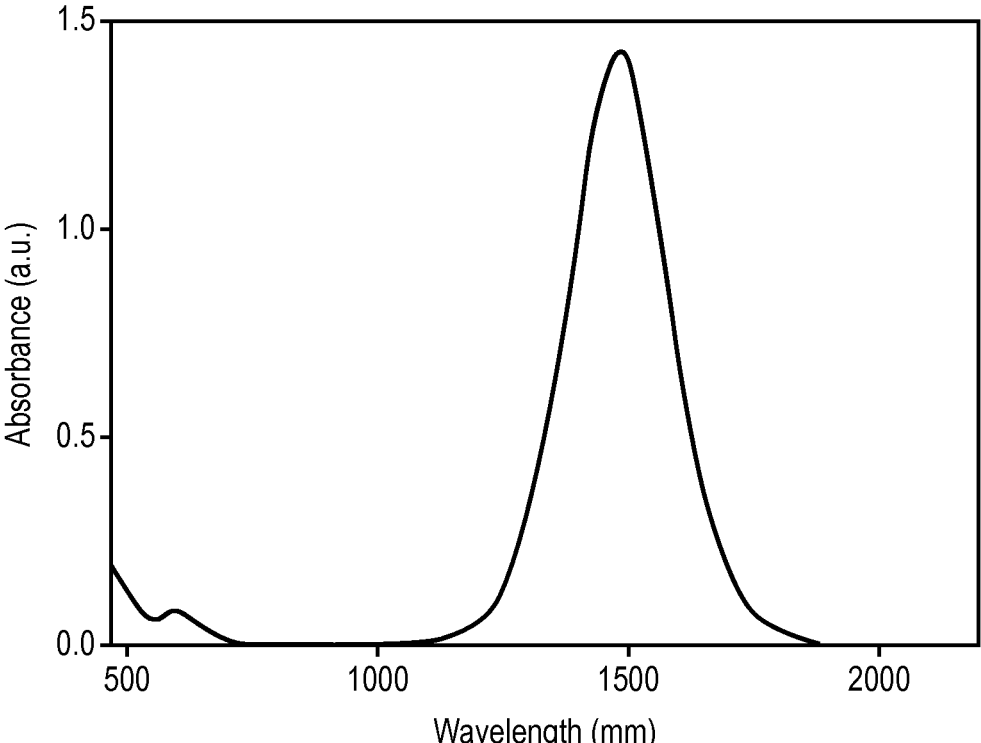
FIG. 5A illustrates a gold metal complex for optical shape sensing and spectral tissue sensing, in accordance with a representative embodiment.
FIG. 5B illustrates absorption spectra of the gold metal complex for optical shape sensing and spectral tissue sensing in FIG. 5A, in accordance with a representative embodiment.

FIG. 5A illustrates a gold metal complex for optical shape sensing and spectral tissue sensing, in accordance with a representative embodiment.

In FIG. 5A, the neutral gold complex is a material used as the terminator 450 for FIGS. 4A, 4B and 4C. The neutral gold complex in FIG. 5A is a light absorbing element that absorbs light in a band around 1545 nm and is otherwise sufficiently transparent at the visible and near-infrared light i.e. between 400 nm and 1300 nm.

FIG. 5B illustrates an absorption spectrum of the gold metal complex for optical shape sensing and spectral tissue sensing in FIG. 5A, in accordance with a representative embodiment.

In FIG. 5B, the X axis represents wavelength in nanometers (nm), and the Y axis represents absorbance in arbitrary units (a.u.). Absorbance may be determined by the common logarithm of the ratio of incident to transmitted radiant power through a material. In embodiments described herein, the absorbing material may be substantially transparent between 400 nm and 1300 nm, and substantially absorbent from 1535 nm to 1555 nm or even from 1520 nm to 1570 nm.

The optical absorption spectra resulted from measurements in a test environment with 0.286 mM solution of the gold complex in carbon disulfide ($CS_2$) placed in a 1 mm thick quartz cell (for details see paper G. Chatzikyakos et al. "Nonlinear optical response of a symmetrical Au dithiolene complex under ps and ns laser excitation in the infrared and in the visible", Chemical Physics Letters 513 (2011) 229-235). The absorption spectrum of the gold complex in FIG. 5A exhibits a high absorption in the area 1450-1550 nm and is sufficiently transparent in the wavelength range(s) of interest around 600 nm and 1200 nm. If exact tuning is desired, chemical changes in the aromatic sidechains of the complex can result in a maximum absorption wavelength of 1545 nm.

Figures 6A, 6B:
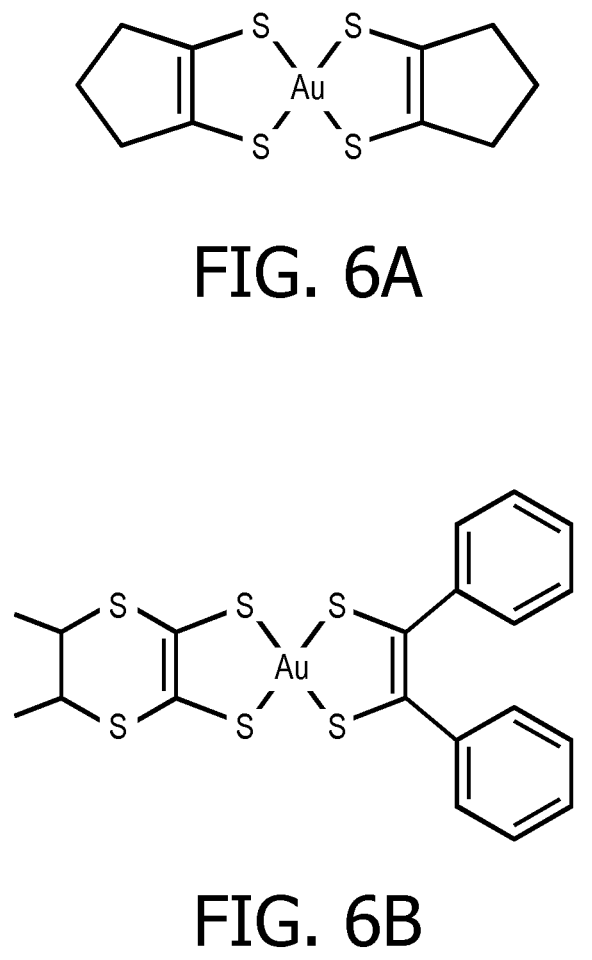

FIGS. 6A and 6B are examples of the dependence of maximum absorption wavelength on the chemical structure of gold complexes such as the gold complex shown in FIG. 5A.

FIG. 6A illustrates a gold metal complex with maximum absorption wavelength of 1500 nm for optical shape sensing and spectral tissue sensing, in accordance with a representative embodiment.

The compound of FIG. 6A exhibits a maximum absorption wavelength of 1500 nm and is an example of how the gold complex in FIG. 5A can be chemically changed to result in a higher maximum absorption wavelength.

FIG. 6B illustrates a gold metal complex with maximum absorption at a wavelength of 1670 nm for optical shape sensing and spectral tissue sensing, in accordance with a representative embodiment.

The compound of FIG. 6B exhibits a maximum absorption at a wavelength of 1670 nm and is another example of how the gold complex in FIG. 5A can be chemically changed to result in a higher maximum absorption wavelength.

Figure 7:
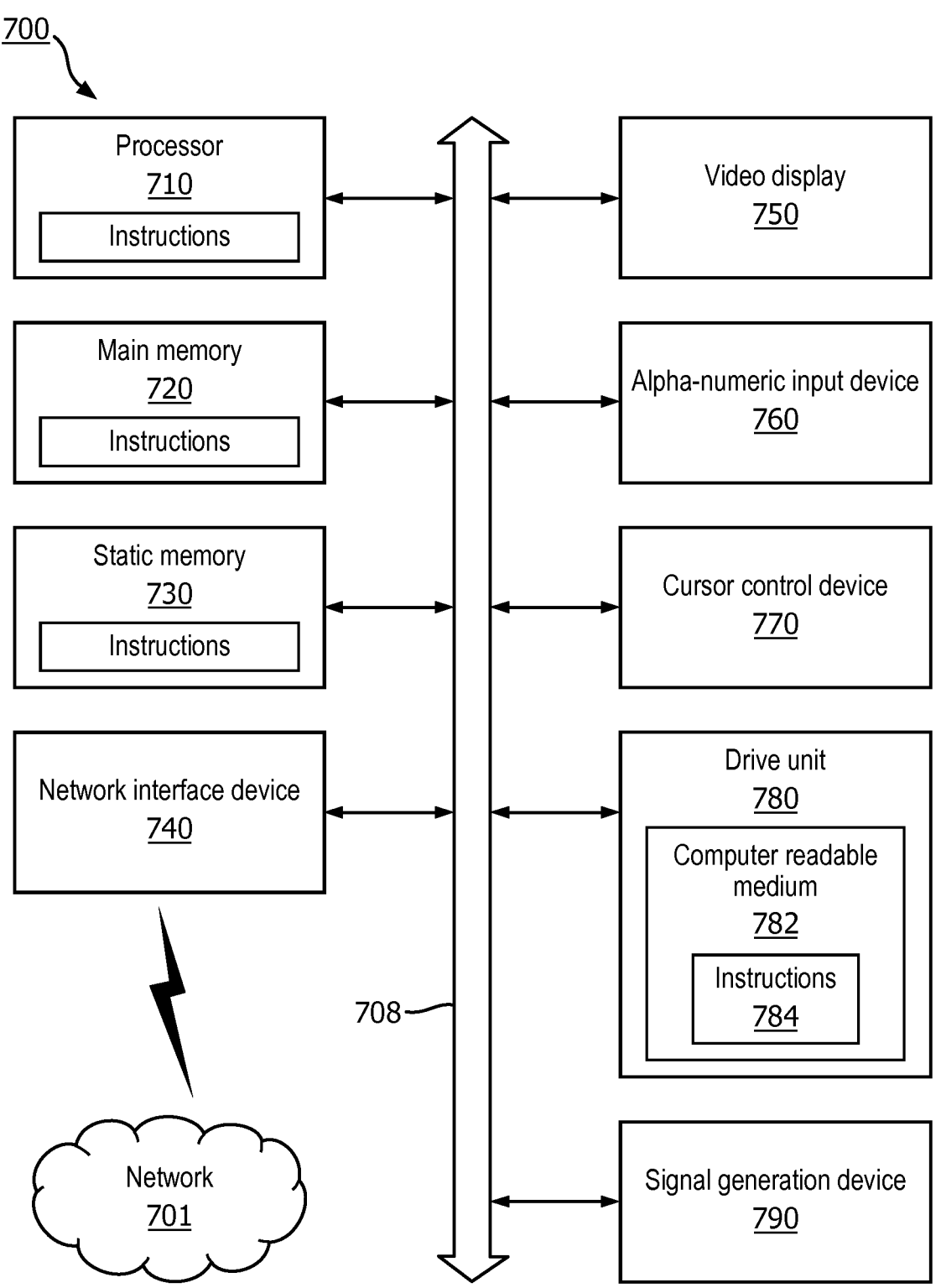
FIG. 7 is an illustrative embodiment of a general computer system, on which a method of spectral tissue sensing in optical shape sensing and spectral tissue sensing can be implemented, in accordance with a representative embodiment.

FIG. 7 is an illustrative embodiment of a general computer system, on which a method of spectral tissue sensing in optical shape sensing and spectral tissue sensing can be implemented, in accordance with a representative embodiment.

The computer system 700 can include a set of instructions that can be executed to cause the computer system 700 to perform any one or more of the methods or computer-based functions disclosed herein. The computer system 700 may operate as a standalone device or may be connected, for example, using a network 701, to other computer systems or peripheral devices. Any or all of the elements and characteristics of the computer system 700 in FIG. 7 may be representative of elements and characteristics of any system with a processor that is used to perform spectral tissue sensing based on light that passes through an optical fiber 190 in the prior art, the optical shape sensing fiber 200 in FIG. 2, the multi-core sensor fiber 302 in FIG. 3, or the multi-core fiber 403 in FIGS. 4A, 4B and 4C. Any such system with a processor may have any or all of the elements shown in FIG. 7 and described below, and may have additional elements depending on the nature of the system. The computer system 700 is representative of computerized systems that are configured to perform processes described herein.

In a networked deployment, the computer system 700 may operate in the capacity of a client in a server-client user network environment. The computer system 700 can also be fully or partially implemented as or incorporated into various devices, such as a console, an optical console, a controller, a personal computer (PC), or any other machine capable of executing a set of instructions (sequential or otherwise) that specify actions to be taken by that machine. The computer system 700 can be incorporated as or in a device that in turn is in an integrated system that includes additional devices. In an embodiment, the computer system 700 can be implemented using electronic devices that provide video or data communication. Further, while the computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 includes a processor 710. A processor 710 for a computer system 700 is tangible and non-transitory. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. Any processor described herein is an article of manufacture and/or a machine component. A processor for a computer system 700 is configured to execute software instructions to perform functions as described in the various embodiments herein. A processor for a computer system 700 may be a general-purpose processor or may be part of an application specific integrated circuit (ASIC). A processor for a computer system 700 may also be a microprocessor, a microcomputer, a processor chip, a controller, a microcontroller, a digital signal processor (DSP), a state machine, or a programmable logic device. A processor for a computer system 700 may also be a logical circuit, including a programmable gate array (PGA) such as a field programmable gate array (FPGA), or another type of circuit that includes discrete gate and/or transistor logic. A processor for a computer system 700 may be a central processing unit (CPU), a graphics processing unit (GPU), or both. Additionally, any processor described herein may include multiple processors, parallel processors, or both. Multiple processors may be included in, or coupled to, a single device or multiple devices.

Moreover, the computer system 700 includes a main memory 720 and a static memory 730 that can communicate with each other via a bus 708. Memories described herein are tangible storage mediums that can store data and executable instructions and are non-transitory during the time instructions are stored therein. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. A memory described herein is an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted.

As shown, the computer system 700 may further include a video display unit 750, such as a liquid crystal display (LCD), an organic light emitting diode (OLED), a flat panel display, a solid-state display, or a cathode ray tube (CRT). Additionally, the computer system 700 may include an input device 760, such as a keyboard/virtual keyboard or touch-sensitive input screen or speech input with speech recognition, and a cursor control device 770, such as a mouse or touch-sensitive input screen or pad. The computer system 700 can also include a disk drive unit 780, a signal generation device 790, such as a speaker or remote control, and a network interface device 740.

In an embodiment, as depicted in FIG. 7, the disk drive unit 780 may include a computer-readable medium 782 in which one or more sets of instructions 784, e.g. software, can be embedded. Sets of instructions 784 can be read from the computer-readable medium 782. Further, the instructions 784, when executed by a processor, can be used to perform one or more of the methods and processes as described herein. In an embodiment, the instructions 784 may reside completely, or at least partially, within the main memory 720, the static memory 730, and/or within the processor 710 during execution by the computer system 700.

In an alternative embodiment, dedicated hardware implementations, such as application-specific integrated circuits (ASICs), programmable logic arrays and other hardware components, can be constructed to implement one or more of the methods described herein. One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

The present disclosure contemplates a computer-readable medium 782 that includes instructions 784 or receives and executes instructions 784 responsive to a propagated signal; so that a device connected to a network 701 can communicate video or data over the network 701. Further, the instructions 784 may be transmitted or received over the network 701 via the network interface device 740.

Figure 8:
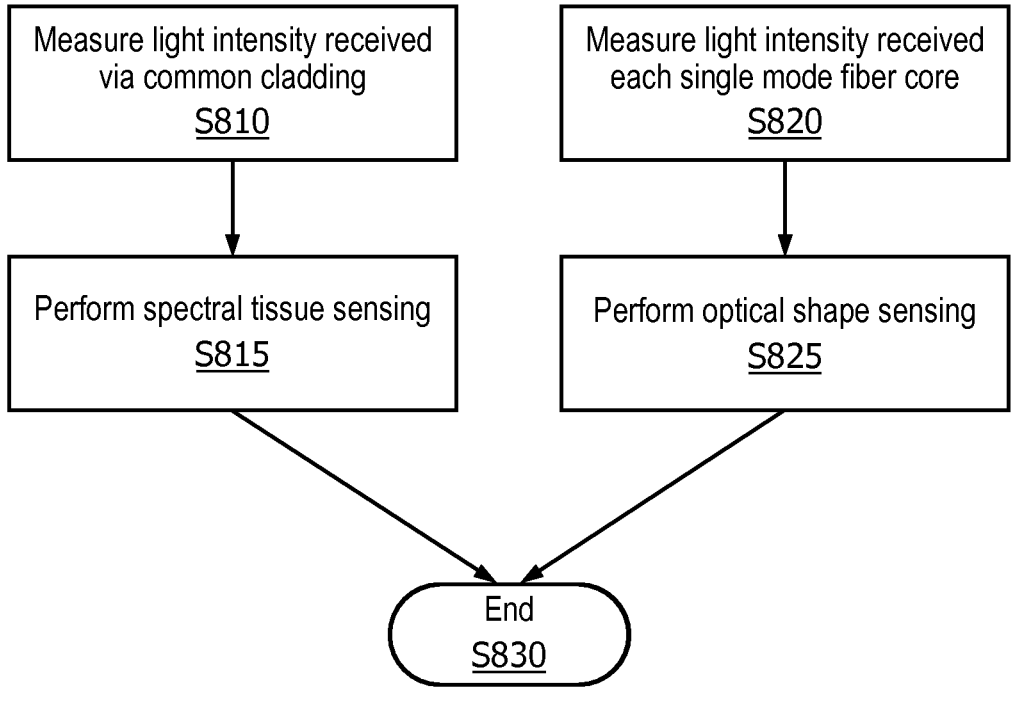
FIG. 8 illustrates a process for using an optical shape sensing fiber system for integrated fiber for optical shape sensing and spectral tissue sensing, in accordance with a representative embodiment.

FIG. 8 illustrates a process for using an optical shape sensing fiber system for integrated fiber for optical shape sensing and spectral tissue sensing, in accordance with a representative embodiment.

In FIG. 8, the process starts at S810 by measuring light intensity received by common cladding. The light received by common cladding is subject to spectral tissue sampling at S815.

The spectral tissue sampling can be performed via an optical console, such as the console connected to the multi-core console fiber 301 in FIG. 3. The fiber of an interventional medical device is connected to the multi-core console fiber 301 in FIG. 3 via the mechanism shown with the GRIN lens 341, GRIN lens 342 and beamsplitter with bandpass 340. The fiber of the interventional medical device is thus connected to an optical console. The optical guide of the optical console may be an optical waveguide. The optical guide guides the emitted light. The reflected light is detected for the spectral tissue sampling. In a specific embodiment, the optical console includes a light source in the form of a halogen broadband light source with an embedded shutter. A sleeve around an interventional medical device may include an optical detector for detecting the reflected light. The optical detector can resolve light with a wavelength substantially in the visible and infrared regions of the wavelength spectrum, such as from 400 nm to 1500 nm. The multi-core console fiber 301 and the multi-core sensor fiber 302 in FIG. 3 allow for sending and receiving light enabling diffuse reflectance measurements.

A processor such as the processor 710 in FIG. 7 transforms the measured spectra in into physiological parameters that are indicative for the tissue state for each source-detector pair. An example of an algorithm performed by a processor such as the processor 710 in FIG. 7 is as follows.

In the algorithm used as an example for extracting physiological parameter, the acquired spectra are fitted using a customized program based on, for example, Matlab 7.9.0 (Mathworks, Natick, MA). In the algorithm, a widely accepted analytical model is implemented, namely the model introduced by the following document:

"Estimation of biological chromophores using diffuse optical spectroscopy: benefit of extending the UV-VIS wavelength range to include 1000 to 1600 nm," R. Nachabé, B. H. W. Hendriks, M. V. D. Voort, A. E, and H. J. C. M. Sterenborg, *Optics Express, vol.* 18, 2010, pp. 879-888.

The input arguments for the noted model are the absorption coefficient, the reduced scattering coefficient and the center-to-center distance between the emitting and collecting fibers at the tip of the probe, also known as the source-detector separation (SDS). For a complete description of the diffusion theory model, reference is made to the following document:

"A diffusion theory model of spatially resolved, steady-state diffuse reflectance for the non-invasive determination of tissue optical properties," T. J. Farrell, M. S. Patterson and B. C. Wilson, Med. Phys. 19 (1992) p. 879-888.

The formulas used in the model are primarily based on work of Nachabé et al. noted above, as well as the work of the following document:

"Estimation of lipid and water concentrations in scattering media with diffuse optical spectroscopy from 900 to 1600 nm," R. Nachabé, B. H. W. Hendriks, A. E. Desjardins, M. van der Voort, M. B. van der Mark, and H. J. C. M. Sterenborg, *J. Biomed. Opt., vol.* 15, no. 3, pp. 37015-10, 2010.

The input arguments for the noted model are the absorption coefficient, the reduced scattering coefficient and the center-to-center distance between the emitting and collecting fibers at the tip of the probe, also known as the source-detector separation (SDS). For a complete description of the diffusion theory model, reference is made to the following document which is also hereby incorporated by reference in its entirety as reference [2]:

"A diffusion theory model of spatially resolved, steady-state diffuse reflectance for the non-invasive determination of tissue optical properties," T. J. Farrell, M. S. Patterson and B. C. Wilson, Med. Phys. 19 (1992) p. 879-888.

The formulas used in the model are primarily based on work of Nachabé et al. noted above, as well as the work of the following document which is also herby incorporated by reference in its entirety as reference [3]:

"Estimation of lipid and water concentrations in scattering media with diffuse optical spectroscopy from 900 to 1600 nm," R. Nachabé, B. H. W. Hendriks, A. E. Desjardins, M. van der Voort, M. B. van der Mark, and H. J. C. M. Sterenborg, *J. Biomed. Opt.,* vol. 15, no. 3, pp. 37015-10, 2010.

A double power law function can be used to describe the wavelength dependence of the reduced scattering, where the wavelength $\lambda$ is expressed in nm and is normalized to a wavelength value of $\lambda_0=800$ nm. The parameter a corresponds to the reduced scattering amplitude at this specific wavelength.

$$\mu_s'(\lambda) = a\left(\rho_{MR}\left(\frac{\lambda}{\lambda_0}\right)^{-b} + (1-\rho_{MR})\left(\frac{\lambda}{\lambda_0}\right)^{-4}\right) [cm^{-1}] \qquad (Eq.\ 1)$$

In equation (1), the reduced scattering coefficient is expressed as the sum of Mie and Rayleigh scattering where $\rho_{MR}$ is the Mie-to-total reduced scattering fraction. The reduced scattering slope of the Mie scattering is denoted b and is related to the particle size.

Figure 10A:
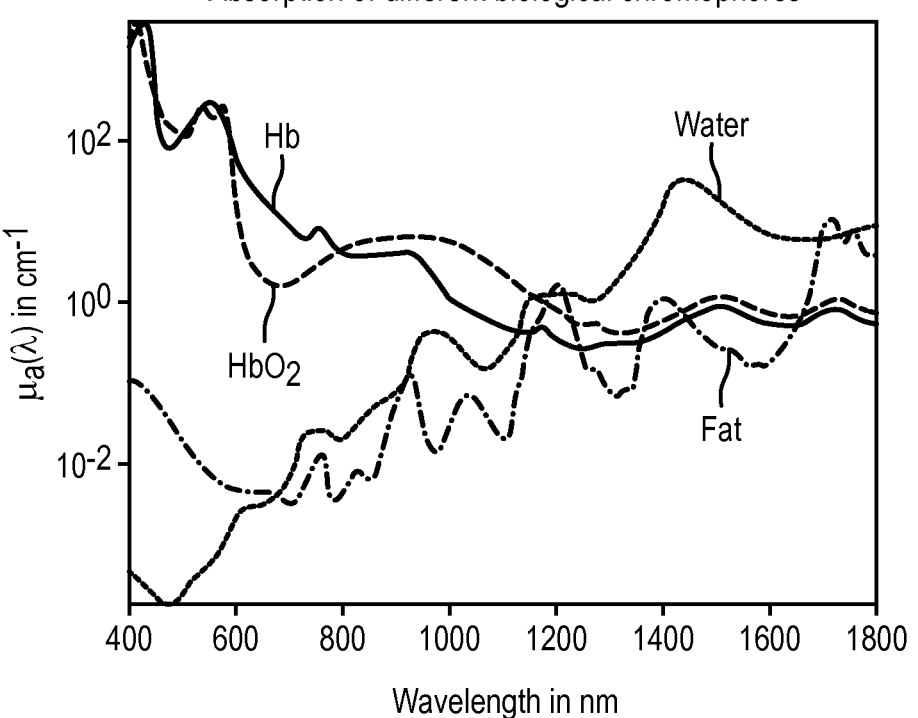
FIG. 10A illustrates a log plot of absorption spectra of blood, water and fat in optical shape sensing and spectral tissue sensing, in accordance with a representative embodiment.

For a homogeneous distribution of absorbers, the total light absorption coefficient can be computed as products of the extinction coefficients and volume fraction of the absorbers (see FIG. 10A):

$$\mu_a^{Total}=f_1\mu_a^1+f_2\mu_a^2+f_3\mu_a^3+\dots \qquad (Eq.\ 2)$$

Instead of modeling the absorption coefficient $\mu_a(\lambda)$ as the sum of absorption coefficients weighted by the respective concentrations of the four chromophores of interest, the tissue absorption coefficient is expressed as $$\mu_a^{Tissue}(\lambda)=C(\lambda)v_{Blood}\mu_a^{Blood}(\lambda)+v_{WL}\mu_a^{WL}(\lambda) [cm^{-1}] \qquad (Eq.\ 3)$$

where $\mu_a^{Blood}(\lambda)$ corresponds to the absorption by blood and $\mu_a^{WL}(\lambda)$ corresponds to absorption by water and lipid together in the probed volume. The volume fraction of water and lipid is $v_{WL}$=[Lipid]+[H$_2$O], whereas $v_{Blood}$ represents the blood volume fraction for a concentration of hemoglobin in whole blood of 150 mg/ml.

The factor C is a wavelength dependent correction factor that accounts for the effect of pigment packaging and alters for the shape of the absorption spectrum. This effect can be explained by the fact that blood in tissue is confined to a very small fraction of the overall volume, namely blood vessels. Red blood cells near the center of the vessel therefore absorb less light than those at the periphery. Effectively, when distributed homogeneously within the tissue, fewer red blood cells would produce the same absorption as the actual number of red blood cells distributed in discrete vessels. The correction factor can be described as $$C(\lambda) = \frac{1 - \exp(-2R\mu_a^{Blood}(\lambda))}{2R\mu_a^{Blood}(\lambda)}, \qquad \text{(Eq. 4)}$$

where R denotes the average radius of the vessel expressed in cm. The absorption coefficient related to blood is given by $$\mu_a^{Blood}(\lambda) = \alpha_{BL}\mu_a^{HbO_2}(\lambda) + (1-\alpha_{BL})\mu_a^{Hb}(\lambda) \; [cm^{-1}] \qquad \text{(Eq. 5)}$$

In Equation 5, $\mu_a^{HbO_2}(\lambda)$ and $\mu_a^{Hb}(\lambda)$ represent the basic extinction coefficient spectra of oxygenated hemoglobin $HbO_2$ and deoxygenated hemoglobin Hb, respectively. The oxygenated hemoglobin fraction in the total amount of hemoglobin is noted $\alpha_{BL}=[HbO_2]/([HbO_2]-[Hb])$ and is commonly known as the blood oxygen saturation. The absorption due to the presence of water and lipid in the measured tissue is defined as $$\mu_a^{WL}(\lambda) = \alpha_{WL}\mu_a^{Lipid}(\lambda) + (1-\alpha_{WL})\mu_a^{H2O}(\lambda) \; [cm^{-1}] \qquad \text{(Eq. 5)}$$

more stable fit.

Also, in FIG. 8 light received via each single mode fiber core is measured at S820. Optical shape sensing is performed at S825 based on the light measured at S820 from each single mode fiber core. The process ends at S830.

In FIG. 8, it should be clear that spectral tissue sensing and optical shape sensing can be performed in parallel, and this results from use of the integrated dual-use fiber described herein. That is, while spectral tissue sensing and optical shape sensing do not have to be performed simultaneously or even by the same processor, they can be performed simultaneously and/or by the same processor.

Figure 9:
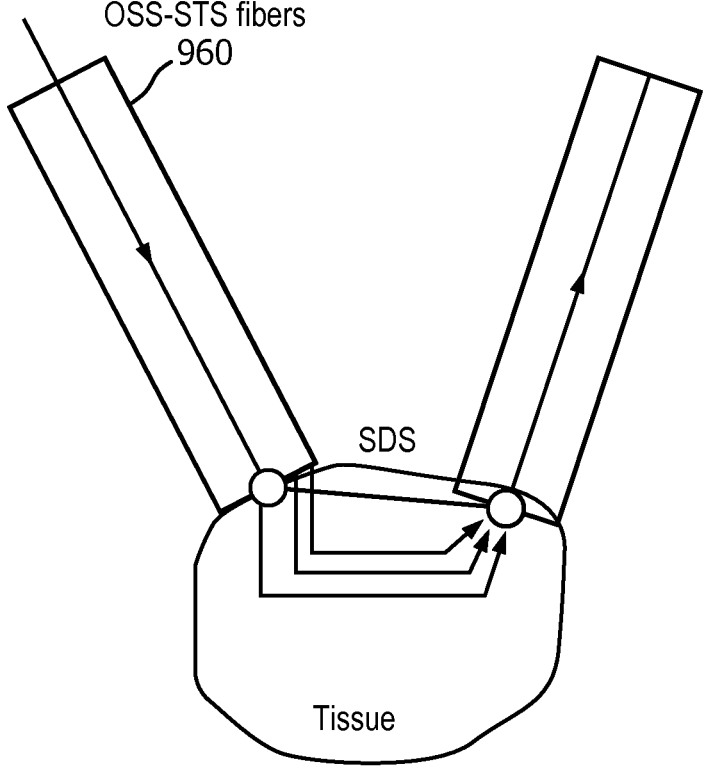
FIG. 9 illustrates an arrangement of two integrated fibers for optical shape sensing and spectral tissue sensing, in accordance with a representative embodiment.

FIG. 9 illustrates an arrangement of two integrated fibers for optical shape sensing and spectral tissue sensing, in accordance with a representative embodiment.

In order to quantify tissue properties with spectral tissue sensing, the distance between emitting and collecting OSS-STS fibers 960 must be known. This distance may be known as the source-detector separation (SDS). Additionally, the angles between the emitting and collecting OSS-STS fibers 960 and relative to the tissue must also be known. The angles may be known as the fiber geometry. In most spectral tissue sensing applications a single probe is used which contains both the emitting and collecting OSS-STS fibers 960. When the probe is built the distances between the OSS-STS fibers 960 can be measured. However, there may be applications where it is advantageous to have more flexibility in how the emitting and collecting OSS-STS fibers 960 are positioned, especially when the goal is to measure tissue where the natural channels for a probe such as a catheter are very small. That is, flexibility may be advantageous in the presence of small airways or blood vessels. If one OSS-STS fiber 960 is used as the emitting fiber and another OSS-STS fiber 960 is used as the collecting fiber, the exact positions of both fibers can be determined from shape sensing and this information can be fed into the spectral tissue sensing algorithms when calculating tissue characteristics. This principle applies for both reflectance and transmittance of light through tissue. In FIG. 9, the concept is illustrated for the reflectance mode. The collecting fiber may be on the opposite side of the tissue in transmittance mode.

In other embodiments, the source-detector separation between two OSS-STS fibers 960 can be determined using device pose derived from the optical shape sensing information. Assuming there are at least two OSS-STS devices, where one emits spectral tissue sensing (STS) light and the other collects STS light, the exact distance between the OSS-STS devices can be obtained and used to properly quantify tissue properties. That is, the angle between the two OSS-STS devices and the distances between them can be used to derive tissue properties, and thus are used as input parameters for light propagation algorithms.

As noted above, FIG. 10A illustrates a log plot of absorption spectra of blood, water and fat in optical shape sensing and spectral tissue sensing, in accordance with a representative embodiment. Specifically, in the algorithm described herein, the total light absorption coefficient can be computed as products of the extinction coefficients and volume fraction of the absorbers in order to obtain a homogeneous distribution of absorbers.

Another way to discriminate differences in spectra is by making use of a principal components analysis. This method allows classification of differences in spectra and thus allows discrimination between tissues. It is also possible to extract features from the spectra.

Figure 10B:
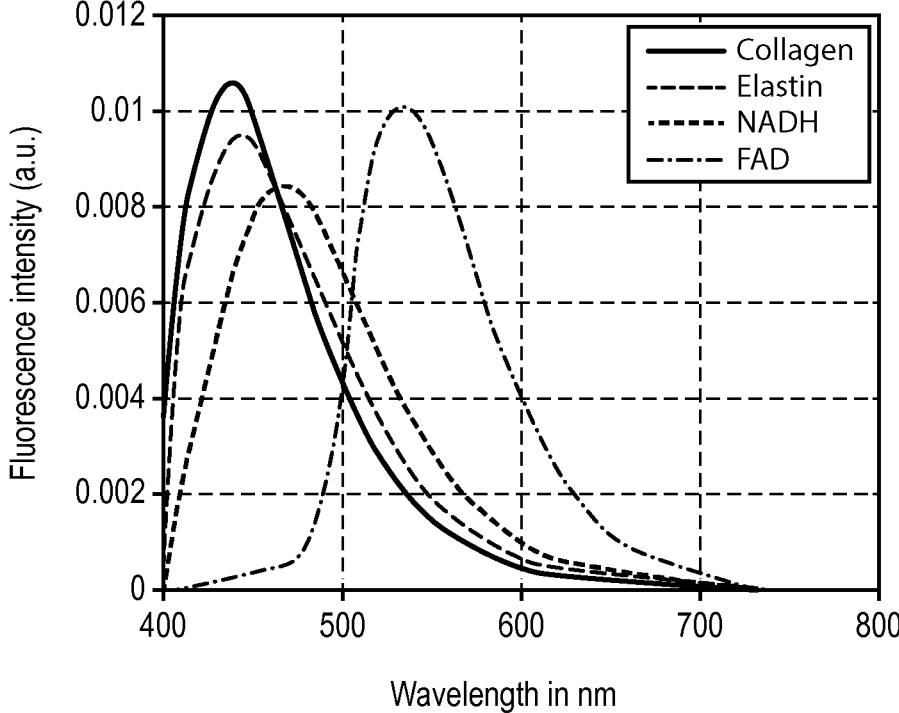
FIG. 10B illustrates intrinsic fluorescence curves for collagen, elastin, NADH and FAD in optical shape sensing and spectral tissue sensing, in accordance with a representative embodiment.

Apart from diffuse reflectance, fluorescence can be measured. Then for instance parameters like collagen, elastin, NADH and FAD could be measured too as shown in FIG. 10B. Especially, the ratio NADH/FAD, which is called the optical redox parameter, is of interest because it is an indicator for the metabolic state of the tissue. This is discussed in "Recovering intrinsic fluorescence by Monte Carlo modeling," M. Müller and B. H. W. Hendriks, J. Biomed. Opt., vol. 18, no. 2, pp. 27009-13, 2013, and is assumed to change upon effective treatment of cancer cells.

As noted above, FIG. 10B illustrates intrinsic fluorescence curves for collagen, elastin, NADH and FAD in optical shape sensing and spectral tissue sensing, in accordance with a representative embodiment.

Additional examples for using optical shape sensing and spectral tissue sensing follow. As context for a first example, only a single point is typically measured at a time in spectral tissue sampling setups. For some clinical applications it may be advantageous to obtain an image with a larger field-of-view, however, with the same resolution as traditional spectral tissue sampling. one way to do this is by using a single point probe to scan the tissue,
acquiring a point at each location
post processing to form an image where each point measurement is a pixel in the image In this example, either a precise setup is required to do these scans, or optical shape sensing can be used to determine the exact location of each measurement. These precise positions can then be used when reconstructing the image. This could be used for either en-face imaging, rotational imaging, or trans-illumination imaging.

In embodiments, an optical shape sensing fiber configured for use in spectral tissue sensing can be used to achieve a variety of different ends. For example, the optical shape sensing fiber can be used to identify position of an interventional medical device along with tissue properties. As a result, a 3D map of a region of interest can be obtained using the optical shape sensing fiber for both functions. The 3D coordinates of the device can be obtained from the optical shape sensing data. The 3D coordinates may include the coordinates along the length of the device and at the tip of the device. The spectral tissue sensing provides knowledge of the tissue properties at each sampled point. Matching the 3D coordinates and the sampled data points allows creation of a 3D map of the tissue properties of the region of interest. This 3D map provides details with a depth of ~1 cm based on the sensing depth of the spectral tissue sensing technology, while the surface area is only limited by the number of points sampled along the surface of a region of interest. Additionally, the resultant 3D tissue property map may be further registered to medical images. For example, the medical images can be fused with the 3D tissue property map to provide further anatomical context as one example.

In another example, extracting hemoglobin concentrations properly from spectral tissue sampling spectra requires a vessel packing factor to be included. The vessel packing factor accounts for the fact that blood runs through vessels and is not dispersed randomly throughout tissue. Other absorbers also utilize this "pigment" packing factor. On a separate note, several reports have shown that probe pressure can impact the accuracy with which hemoglobin and other absorbers are extracted from the spectral tissue sampling spectra. One reason for this may be because blood is pushed out of the vessels when significant pressure is applied, leading to much less hemoglobin in the probing volume than when little to no pressure is applied. The vessel packing factor and the extraction of hemoglobin is then not accurate as the blood has moved away. In this example, optical shape sensing can be used to measure pressures that are placed on the fiber via the axial strain in the cores. Axial strain (and hence force/pressure) derived from optical shape sensing can be used to correct for vessel packing factors in STS algorithms that derive tissue properties. Measuring the axial strain via optical shape sensing while simultaneously acquiring spectral tissue sampling spectra may lead to improvements in mechanisms (e.g., algorithms) for extracting hemoglobin concentrations, as well as other absorber concentrations.

In yet another example, optical shape sensing fibers are also capable of measuring temperature changes. In ablation procedures, for example, where the tissue is heated or cooled, knowing how the tissue is changing during the ablation procedure can lead to better/more optimal outcomes. Currently, physicians have little feedback about the tissue and its response to the ablation during the procedure which can result in acute or permanent damage to healthy tissue. The combination of temperature measurements via optical shape sensing and quantitative tissue characterization via spectral tissue sampling can result in improved monitoring of the tissue changes during ablation procedures. In this example, spectral tissue sampling can be used to derive information about the tissue, like the percentage of fat, water, and blood in the tissue, and optical shape sensing can provide information about the tissue determining temperature or by inferring from the axial strain or twist data how much force is applied to the device. Combining the tissue properties and tissue information derived from both techniques enables improved clinical decision making. For example, in an ablation procedure where the tissue is either heated or cooled, knowing both the temperature of the local tissue and the change in blood content can alter be used to determine the duration of ablation or when to stop the ablation.

Accordingly, integrated fiber for optical shape sensing and spectral tissue sensing enables minimally invasive interventions by using highly flexible devices with both shape sensing as tissue sensing capabilities within a single apparatus, such as within a single outer jacket.

Although integrated fiber for optical shape sensing and spectral tissue sensing has been described with reference to several exemplary embodiments, it is understood that the words that have been used are words of description and illustration, rather than words of limitation. Changes may be made within the purview of the appended claims, as presently stated and as amended, without departing from the scope of the appended claims and which fall within the scope the present invention. Although integrated fiber for optical shape sensing and spectral tissue sensing has been described with reference to particular means, materials and embodiments, integrated fiber for optical shape sensing and spectral tissue sensing is not intended to be limited to the particulars disclosed; rather integrated fiber for optical shape sensing and spectral tissue sensing extends to all functionally equivalent structures, methods, and uses such as are within the scope of the appended claims.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to practice the concepts described in the present disclosure. As such, the above disclosed subject matter is to be considered illustrative, and not restrictive, and the appended claims are intended to cover all such modifications, enhancements, and other embodiments which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

FIG. 2

The invention claimed is:

1. An optical apparatus, comprising:
   an outer jacket;
   common cladding within the outer jacket, said common cladding used as multimode fiber such that the outer jacket clads the common cladding; and
   a plurality of single mode fiber cores configured to provide optical shape sensing and disposed within the common cladding such that the common cladding clads the plurality of single mode fiber cores.

2. The optical apparatus of claim 1, wherein the plurality of single mode fiber cores within the common cladding includes at least two single mode fiber cores with one central core and at least one outer core helically wound around the central core.

3. The optical apparatus of claim 1, wherein each single mode fiber core includes a corresponding Fiber Optic Bragg grating.

4. The optical apparatus of claim 1,
   wherein a refractive index of the common cladding is higher than a refractive index of the outer jacket.

5. The optical apparatus of claim 1,
   wherein the plurality of single mode fiber cores transmit light used for optical shape sensing, and
   wherein the common cladding transmits light used for spectral tissue sensing.

6. The optical apparatus of claim 1, further comprising:
   a first lens that focuses light to the plurality of single mode fiber cores.

7. The optical apparatus of claim 6,
   wherein the first lens comprises a gradient index lens.

8. The optical apparatus of claim 6, further comprising:
   a second lens that focuses light to the plurality of single mode fiber cores; and
   a beamsplitter arranged between the first lens and the second lens to separate first light used for optical shape sensing from second light used for spectral tissue sensing.

9. The optical apparatus of claim 1, further comprising:
   an absorbing material applied on an end of the outer jacket, common cladding and plurality of single mode fiber cores, and that substantially captures first light in wavelengths used for optical shape sensing and substantially transmits second light.

10. The optical apparatus of claim 9,
   wherein the absorbing material is substantially transparent between 400 nm and 1300 nm, and substantially absorbent from 1535 nm to 1555 nm.

11. An optical system, comprising:
   the optical apparatus of claim 1;
   a memory that stores instructions;
   a processor that executes the instructions;
   wherein, when executed by the processor, the instructions cause the optical system to execute a process comprising:
   performing spectral tissue sensing based on light that passes through the common cladding.

12. The optical system of claim 11,
   wherein each single mode fiber core includes a corresponding Fiber Optic Bragg grating, wherein the plurality of single mode fiber cores transmit light used for optical shape sensing, and
   wherein the common cladding transmits light used for spectral tissue sensing.

13. The optical system of claim 11, further comprising:
   a first lens that focuses light to the plurality of single mode fiber cores.

14. The optical system of claim 13, further comprising:
   a second lens that focuses light to the plurality of single mode fiber cores; and
   a beamsplitter arranged between the first lens and the second lens to separate first light used for optical shape sensing from second light used for spectral tissue sensing.

15. The optical system of claim 13, further comprising:
   an absorbing material applied on an end of the outer jacket, common cladding and plurality of single mode fiber cores, and that substantially captures first light in wavelengths used for optical shape sensing and substantially transmits second light.

16. The optical system of claim 15,
   wherein the absorbing material preferably is substantially transparent between 400 nm and 1300 nm, and substantially absorbent from 1535 nm to 1555 nm.

* * * * *